(12) United States Patent
Mei

(10) Patent No.: US 12,093,352 B2
(45) Date of Patent: Sep. 17, 2024

(54) IMAGE PROCESSING METHOD AND APPARATUS BASED ON VIDEO CONFERENCE

(71) Applicant: ZTE CORPORATION, Guangdong (CN)

(72) Inventor: Jidong Mei, Guangdong (CN)

(73) Assignee: ZTE CORPORATIOIN, Guangdong (CN)

( * ) Notice: Subject to any disclaimer, the term of this patent is extended or adjusted under 35 U.S.C. 154(b) by 437 days.

(21) Appl. No.: 17/614,578

(22) PCT Filed: Mar. 11, 2020

(86) PCT No.: PCT/CN2020/078798
§ 371 (c)(1),
(2) Date: Nov. 29, 2021

(87) PCT Pub. No.: WO2020/238324
PCT Pub. Date: Dec. 3, 2020

(65) Prior Publication Data
US 2022/0230267 A1  Jul. 21, 2022

(30) Foreign Application Priority Data
May 27, 2019 (CN) .......................... 201910444757.2

(51) Int. Cl.
*G06F 21/16* (2013.01)
*G06V 40/10* (2022.01)
(Continued)

(52) U.S. Cl.
CPC .............. *G06F 21/16* (2013.01); *G06V 40/10* (2022.01); *G06V 40/20* (2022.01); *H04L 63/0861* (2013.01); *G06T 1/0028* (2013.01)

(58) Field of Classification Search
CPC ................................. G06F 21/16; G06F 21/31
See application file for complete search history.

(56) References Cited

U.S. PATENT DOCUMENTS 5,767,897 A * 6/1998 Howell ..................... H04N 7/15
348/E7.083
7,707,262 B1 * 4/2010 Bill ......................... G06Q 10/00
709/204

(Continued)

FOREIGN PATENT DOCUMENTS

| CN | 107370981 A | 11/2017 |
| CN | 107911646 A | 4/2018 |

OTHER PUBLICATIONS

John (Jong Uk) Choi, Soon Ae Chun, Dong Hwa Kim, and Angelos Keromytis. 2013. SecureGov: secure data sharing for government services. In Proceedings of the 14th Annual International Conference on Digital Government Research (dg.o '13). Association for Computing Machinery, New York, NY, USA, 127-135. (Year: 2013).*

(Continued)

*Primary Examiner* — Kari L Schmidt
(74) *Attorney, Agent, or Firm* — NZ CARR LAW OFFICE

(57) ABSTRACT

Provided are an image processing method and apparatus based on a video conference. The image processing method includes: obtaining an image transmitted by an image acquisition terminal; obtaining identity information of a participant; adding the obtained identity information to the image in the form of a watermark to form a watermarked image; and outputting the watermarked image.

14 Claims, 5 Drawing Sheets

(51) Int. Cl.
*G06V 40/20* (2022.01)
*H04L 9/40* (2022.01)
*G06T 1/00* (2006.01)

(56) References Cited

U.S. PATENT DOCUMENTS

| | | | | |
|---|---|---|---|---|
| 8,214,395 | B2* | 7/2012 | Stevens | G06Q 10/10 |
| | | | | 715/255 |
| 8,600,026 | B2* | 12/2013 | Bill | G06Q 10/00 |
| | | | | 726/28 |
| 9,503,452 | B1* | 11/2016 | Kumar | H04L 63/0838 |
| 9,848,003 | B2* | 12/2017 | Stevens | H04L 63/14 |
| 10,419,511 | B1* | 9/2019 | Yuan | H04L 65/403 |
| 2004/0039914 | A1* | 2/2004 | Barr | G06T 1/0071 |
| | | | | 713/176 |
| 2004/0050931 | A1* | 3/2004 | Ono | B42D 25/333 |
| | | | | 235/380 |
| 2006/0157559 | A1* | 7/2006 | Levy | G06Q 20/40145 |
| | | | | 235/380 |
| 2007/0112775 | A1* | 5/2007 | Ackerman | H04N 21/4415 |
| | | | | 707/999.009 |
| 2008/0313082 | A1* | 12/2008 | Van Bosch | G06Q 20/02 |
| | | | | 705/50 |
| 2010/0037151 | A1* | 2/2010 | Ackerman | G06Q 10/10 |
| | | | | 715/753 |
| 2010/0097179 | A1* | 4/2010 | Hayashida | G06F 21/32 |
| | | | | 340/5.82 |
| 2010/0316232 | A1* | 12/2010 | Acero | H04R 27/00 |
| | | | | 379/202.01 |
| 2011/0066860 | A1* | 3/2011 | Dettinger | H04L 67/131 |
| | | | | 713/176 |
| 2012/0315020 | A1* | 12/2012 | Fiumi | G06Q 10/101 |
| | | | | 705/7.14 |
| 2013/0258042 | A1* | 10/2013 | Shun | H04N 7/152 |
| | | | | 348/E7.083 |
| 2014/0067950 | A1* | 3/2014 | Winograd | G06Q 50/01 |
| | | | | 709/204 |
| 2014/0117073 | A1* | 5/2014 | Bell | H04L 12/1818 |
| | | | | 235/375 |
| 2014/0137195 | A1* | 5/2014 | Ballard | H04L 51/00 |
| | | | | 726/3 |
| 2014/0173715 | A1* | 6/2014 | Yano | G06F 21/32 |
| | | | | 726/16 |
| 2015/0003608 | A1* | 1/2015 | Ansari | H04N 7/147 |
| | | | | 380/201 |
| 2015/0016661 | A1* | 1/2015 | Lord | H04N 21/42203 |
| | | | | 382/100 |
| 2015/0294173 | A1* | 10/2015 | Cao | G06F 21/44 |
| | | | | 382/115 |
| 2015/0365406 | A1* | 12/2015 | Lee | H04L 9/3231 |
| | | | | 713/186 |
| 2016/0253508 | A1* | 9/2016 | Song | G06F 21/554 |
| | | | | 726/29 |
| 2017/0048221 | A1* | 2/2017 | Melton | G06F 21/6245 |
| 2017/0223066 | A1* | 8/2017 | Grevers, Jr. | H04L 65/1083 |
| 2018/0109570 | A1* | 4/2018 | Kowal | H04L 65/403 |
| 2018/0278796 | A1* | 9/2018 | Hasegawa | H04N 1/00408 |
| 2019/0073490 | A1* | 3/2019 | Agrawal | G06F 3/1454 |
| 2019/0190908 | A1* | 6/2019 | Shen | H04L 65/403 |

OTHER PUBLICATIONS

Choi, John, Soon Ae Chun, and Joo-Won Cho. "Smart securegov: mobile government security framework." Proceedings of the 15th Annual International Conference on Digital Government Research. 2014, 91-99. (Year: 2014).*

Gugelmann, David, et al. "Screen watermarking for data theft investigation and attribution." 2018 10th International Conference on Cyber Conflict (CyCon). IEEE, 2018, 391-408. (Year: 2018).*

International search report of PCT Patent Application No. PCT/CN2020/078798 issued on Jun. 19, 2020.

* cited by examiner

IMAGE PROCESSING METHOD AND APPARATUS BASED ON VIDEO CONFERENCE

CROSS-REFERENCE TO RELATED APPLICATION

This application claims the priority of Chinese patent application CN 201910444757.2, entitled "Image Processing Method and Apparatus Based on Video Conference" and filed on May 27, 2019, the entirety of which is incorporated herein by reference.

FIELD OF THE INVENTION

The present disclosure relates to the technical field of image processing, and in particular, to an image processing method based on a video conference and an image processing apparatus based on a video conference.

BACKGROUND OF THE INVENTION

In recent years, the market scale of video conference systems expands year by year. By means of the internet, the video conference systems realize efficient and high-definition teleconferencing at work, improve communication efficiency of users, reduce costs of enterprises in travel expense, improve the management performance, and have partially taken the place of business travel to become the latest mode of telecommuting.

In order to enhance the resolution of video conferences, in current video conference systems, a watermark is usually added at a corresponding position of a video conference image.

However, in relevant technologies, the watermark added with respect to the video conference usually only reflects information of the video conference (such as the time and place of the video conference) but does not reflect personal information, causing a decrease in security and usability of the video conference.

SUMMARY OF THE INVENTION

It is provided an image processing method based on a video conference, in order to improve the security and usability of the video conference.

According to one aspect, an embodiment of the present disclosure provides an image processing method based on a video conference. The method includes: obtaining an image transmitted by an image acquisition terminal; obtaining identity information of a participant; adding the identity information obtained to the image in the form of a watermark to form a watermarked image; and outputting the watermarked image.

According to another aspect, another embodiment of the present disclosure provides an image processing apparatus based on a video conference. The apparatus includes: an obtaining module configured to obtain an image transmitted by an image acquisition terminal and obtain identity information of a participant; a processing module configured to add the identity information obtained by the obtaining module to the image in the form of a watermark to form a watermarked image; and an outputting module configured to output the watermarked image.

BRIEF DESCRIPTION OF THE DRAWINGS

The drawings described herein are used to provide a further understanding of the present disclosure and constitute a part of the present disclosure. The exemplary embodiments of the present disclosure and descriptions thereof are used to explain the present disclosure, and do not constitute improper limitations to the present disclosure. In the drawings.

DETAILED DESCRIPTION OF THE EMBODIMENTS

Figure 1:
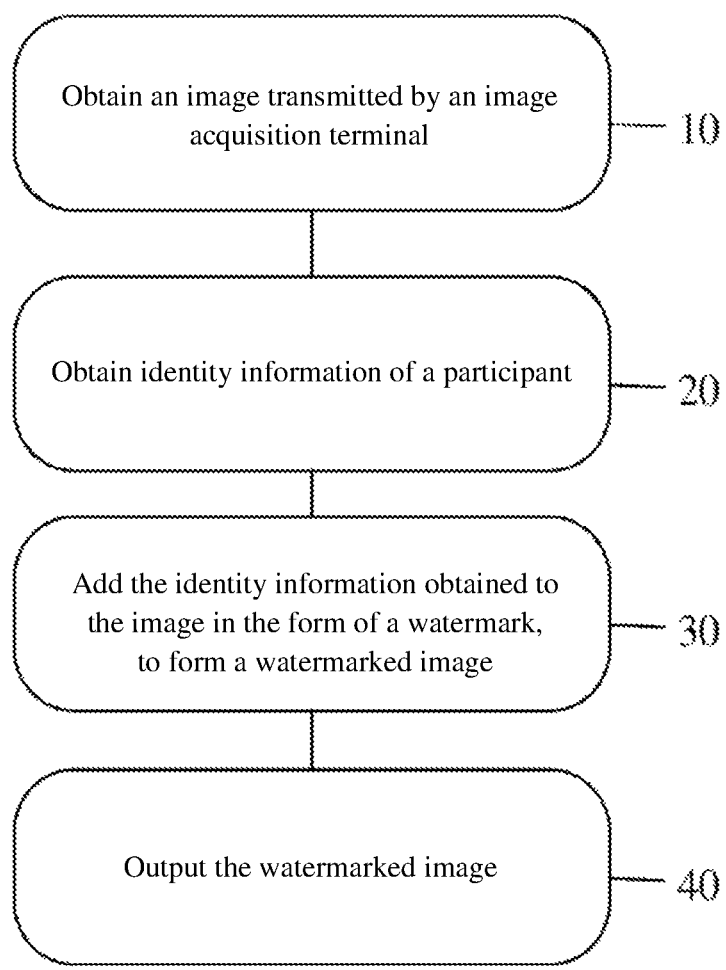
FIG. 1 is a flowchart of an image processing method based on a video conference provided according to an embodiment of the present disclosure.

In order to make the objective, technical solutions, and advantages of the present disclosure clearer, the technical solutions of the present disclosure are described clearly and completely in conjunction with specific embodiments of the present disclosure with reference to corresponding accompanying drawings. Obviously, the embodiments described are merely some embodiments, rather than all embodiments, of the present disclosure. All other embodiments obtained by a person of ordinary skill in the art based on the embodiments of the present disclosure without making creative efforts fall into the protection scope of the present disclosure.

In embodiments of the present disclosure, a video conference system may include an image processing apparatus and an image acquisition terminal. The image processing apparatus may be provided with an MCU (Micro Controller Unit) therein. The image processing apparatus may be coupled to multiple image acquisition terminals. Respective image acquisition terminals may be equivalent in hardware, or may be not equivalent either. For example, an image acquisition terminal may have an additional function (for example, a projection function) compared with another image acquisition terminal.

In the embodiments of the present disclosure, the image processing apparatus may be an information processing and control center of the video conference system, and may have functions of image recognition and image processing. The image acquisition terminal may have functions of image acquiring and image transmitting. The image acquisition terminal may also be connected to some external connection devices through interfaces. The external connection devices may include, but are not limited to, a display, a speaker, a microphone, a projector, a group of panoramic cameras, and the like. Also, depending on requirements, the external connection devices may be part of the image acquisition terminal. The image acquisition terminal may be a terminal having the function of image acquiring. For example, the image acquisition terminal may be a camera, a vidicon, a mobile phone, and the like, or may be a terminal including at least one camera (for example, a group of cameras). In the embodiments of the present disclosure, at least one image acquisition terminal may be deployed in each conference venue of a video conference to acquire an image of the current conference venue and transmit the image acquired to the image processing apparatus.

In the embodiments of the present disclosure, participants may refer to all people who participate in the conference in respective conference venues, and a participant may be a host of the conference, an audience, a speaker, a sharer, a person who performs surreptitious photographing, and the like.

The sharer is a person who requests to share content in his/her own device such as the mobile phone or a tablet computer to other participants, among the participants. The content to be shared may be data that is prepared in advance before the conference and is related to the subject of the conference, and may be an audio, a video, text, and the like.

The person who performs surreptitious photographing is one of the at least one participant, and is a person who performs surreptitious photographing on conference content without permission.

The host of the conference may be a general superintendent of the conference, and the host of the conference is a person who may determine whether the sharer is allowed to share content.

In the embodiments of the present disclosure, the video conference system may further include a sharing control terminal. The sharing control terminal is configured to determine whether the sharer is allowed to share content, and may be controlled by the host of the conference.

Technical solutions provided in various embodiments of the present disclosure are described in detail below with reference to the accompanying drawings.

FIG. 1 is a flowchart of an image processing method based on a video conference provided according to an embodiment of the present disclosure. Referring to FIG. 1, the present embodiment provides an image processing method based on a video conference, and the method may be carried out by the image processing apparatus. The image processing method may include the following steps.

At step 10, an image transmitted by an image acquisition terminal is obtained.

The image transmitted by the image acquisition terminal may include: a conference image acquired by the image acquisition terminal at a conference venue, the conference image being a real-time conference image; or an image with respect to sharing content transmitted by the image acquisition terminal, i.e., a sharing image.

In the present embodiment, the image transmitted by the image acquisition terminal may be obtained through various ways. One way is that the image of the video conference acquired by the image acquisition terminal deployed at the conference venue is sent to the image processing apparatus, so that the image processing apparatus may obtain the image acquired by the image acquisition terminal. Meanwhile, during the conference, if a new conference venue is added, an image acquisition terminal deployed in the new conference venue may also upload a conference image of the new conference venue to the image processing apparatus, and a conference image information repository of the image processing apparatus is updated accordingly.

In the case of sharing, an image acquisition device may also transmit an image with respect to the sharing content to the image processing apparatus. In this way, the image obtained by the image processing apparatus in step 10 is the image with respect to the sharing content. When the image transmitted by the image acquisition terminal is the sharing image, the image acquisition terminal may acquire the sharing content from an external target device (such as the mobile phone) through a sharing interface. The sharing content may be an audio, a video, and an image, and the sharing interface may be a connection manner such as wireless projection to a screen. After the image acquisition terminal acquires the sharing content from the external target device, the image acquisition terminal may transmit the image of the sharing content to the image processing apparatus.

At step 20, identity information of a participant is obtained.

The participant may include at least one of an ordinary audience (i.e., an ordinary participant), a sharer, a host of the conference, a person who performs surreptitious photographing, and the like.

Obtaining the identity information of the participant in step 20 may include a process of obtaining the identity information of the participant based on the image obtained in step 10. In an implementation, the image processing apparatus may obtain biometric information of the participant from the image based on image recognition; matching is performed on the biometric information obtained and characteristic information in an identity information repository which includes characteristic information of the participant, identity information of the participant, and a correspondence relationship between the characteristic information and the identity information; and if the identity information repository contains characteristic information that matches the biometric information obtained, identity information corresponding to the characteristic information matched is used as the identity information of the participant.

In the present embodiment, the biometric information includes, but is not limited to, human face information, iris information, and the like.

It is certain that, in the present embodiment, the identity information of the participant may also be obtained based on audio information of the participant.

In an implementation, matching is performed on the audio information of the participant and audio information in an audio information repository; and if the audio information repository contains audio information that matches the audio information obtained, identity information corresponding to the audio information matched is used as the identity information of the participant.

It should be understood that, obtaining the identity information based on the image recognition is only illustrated as example in the description below, but is not intended as a limitation. In the present embodiment, it is also possible to obtain the identity information based on the audio recognition.

When the participant is the sharer, in the process of obtaining the identity information of the participant in step 20, the image processing apparatus may obtain biometric information of the participant from the image based on the image recognition; and matching is performed on the biometric information obtained and characteristic information in an identity information repository. If the identity information repository contains characteristic information that matches the biometric information obtained, identity information corresponding to the characteristic information matched is used as the identity information of the participant.

Meanwhile, if the identity information repository contains characteristic information that matches the biometric information obtained, it may be determined that the identity information of the participant is legal; and if the identity information repository does not have characteristic information that matches the biometric information obtained, it may be determined that the identity information of the participant is illegal. If it is determined that the identity information of the participant is legal, the image processing apparatus may determine whether the participant makes a sharing request based on action recognition and/or audio recognition. In an embodiment, the image processing apparatus may determine whether a corresponding action of the participant in the image and/or an audio input by the participant obtained matches a sharing request action or a sharing request audio preset in the image processing apparatus. If the corresponding action of the participant in the image and/or an audio input by the participant obtained matches the sharing request action or the sharing request action audio preset in the image processing apparatus, it is determined that the above participant makes the sharing request and is the sharer; and if the corresponding action of the participant in the image and/or an audio input by the participant obtained does not match the sharing request action or the sharing request action audio preset in the image processing apparatus, it is determined that the above participant does not make the sharing request and is not the sharer.

It should be understood that, in the present embodiment, after it is determined that the identity information of the participant is legal and the participant makes the sharing request (i.e., the participant is the sharer), the sharer may be directly allowed to share content. It is certain that, in another embodiment, after it is determined that the identity information of the participant is legal and the participant makes the sharing request, whether the sharer is allowed to share content may be further determined.

In an implementation, in the process of determining whether the sharer is allowed to share content based on the sharing request, it may be determined whether the sharer is an authorized participant based on the sharing request; it may be determined that the sharer is disallowed to share content when the sharer is an unauthorized participant; the sharing request may be sent to the sharing control terminal when the sharer is the authorized participant; it may be determined that the sharer is allowed to share content when a sharing consent feedback sent by the sharing control terminal is received; and it may be determined that the sharer is disallowed to share content when no sharing consent feedback sent by the sharing control terminal is received.

When the participant is the person who performs surreptitious photographing, in the process of obtaining the identity information of the participant in step 20, it may be determined whether a surreptitious photographing behavior exists based on the image obtained in step 10; and the identity information of the person who performs surreptitious photographing may be obtained when the surreptitious photographing behavior exists.

In the process of determining whether the surreptitious photographing behavior exists based on the image obtained, it is detected whether a suspected photographing behavior exists in the image obtained; a focused image with respect to the suspected photographing behavior acquired by the image acquisition terminal is obtained when the suspected photographing behavior exists in the image obtained; and it is determined whether the surreptitious photographing behavior exists based on the focused image.

In the process of obtaining the identity information of the person who performs the surreptitious photographing, the image processing apparatus may obtain biometric information of the person who performs the surreptitious photographing from the image based on the image recognition; matching is performed on the biometric information obtained and characteristic information in the identity information repository; and if the identity information repository contains characteristic information that matches the biometric information obtained, the identity information corresponding to the characteristic information matched is used as the identity information of the person who performs the surreptitious photographing.

In a process of determining whether the surreptitious photographing behavior exists, the image processing apparatus performs matching on an action in the image obtained and a pre-stored suspected photographing action and calculates a similarity therebetween, and if the similarity is greater than a threshold, it may be determined that the participant is suspected to perform photographing. At this time, the image processing apparatus may give an instruction to enable a lens of the image acquisition device to focus on the participant, so as to obtain a clearer image. The MCU performs a second determination on the clearer focused image by the action recognition. If the action of the participant in the focused image matches a photographing action pre-stored in the MCU (for example, the similarity is greater than a preset value), it is determined that the participant performs the surreptitious photographing behavior.

At step 30, the identity information obtained is added to the image in the form of a watermark, to form a watermarked image.

The identity information that needs to be added in the form of the watermark may include the identity information of the ordinary participant, the identity information of the sharer, and the identity information of the person who performs surreptitious photographing.

In an embodiment, the identity information of the participant obtained is added to the real-time conference image in the form of the watermark, to form the watermarked image. The participant may include any of the participant, the sharer, and the person who performs surreptitious photographing, who participate in the conference.

A position of the watermark is determined based on feature parameters for the conference image. The feature parameters include, but are not limited to, a person size of the participant, a position, color, and brightness of the participant, and a displacement vector of the participant. Based on person information identified in the image, a position, a size, color, and brightness of the watermark to be added is determined according to the position, the size, the color, the brightness of the person. For example, a central position and a direction of the watermark is determined by calculating a size and an orientation of a diagonal vector in a person image; and a color value and a brightness value with a greater contrast are selected according to a background color in the person image. A displacement vector of the watermark is determined according to a position vector (a displacement amount of a current frame from a previous frame) of the person image. That is, a displacement of the watermark from an $(n-2)^{th}$ frame to an $(n-1)^{th}$ frame equals to a displacement of the person image from an $(n-1)^{th}$ frame to an $n^{th}$ frame. By moving the watermark in this way, dynamic change of the watermark can be realized. The identity information obtained is added to the real-time conference image at an addition position in the form of the watermark, to form the watermarked image.

In an embodiment, the identity information of the sharer obtained is added to the sharing image in the form of the watermark, to form the watermarked image. When the participant is the sharer, the image acquisition terminal may upload the sharing image acquired from a sharing interface to the image processing apparatus, and the image processing apparatus determines a type of the content in the sharing image and performs processing respectively. If the sharing content is an audio, the image processing apparatus may add subtitles corresponding to audio content in the image, and add a watermark about the identity information of the sharer at a corresponding position of the subtitles, to form the watermarked image. If the sharing content is a video, the image processing apparatus may dynamically add the watermark about the identity information of the sharer at a proper position in the video, to form the watermarked image.

In an embodiment, when the participant is the person who performs surreptitious photographing, in the step 30, the identity information of the person who performs surreptitious photographing obtained may be added to the conference image in the form of a full-screen watermark, to form the watermarked image. In the present embodiment, before adding the watermark with respect to the person who performs surreptitious photographing, information of the video conference may be obtained; and when the information of the video conference meets a specified condition, the identity information obtained is added to the real-time conference image in the form of the watermarked image.

In addition to the identity information, watermarked content may further include key information, such as time information and conference venue information.

At step 40, the watermarked image is output.

The watermarked image may be a watermarked image with respect to the ordinary participant, may be a watermarked image with respect to the person who performs surreptitious photographing, or may be a watermarked image with respect to the sharer.

It should be noted that, in the case of the sharer, in an embodiment, when the sharer is allowed to share content, the image processing apparatus may send a sharing consent message to the image acquisition terminal, receive the sharing content transmitted by the image acquisition terminal, add the identity information of the sharer to the sharing content in the form of the watermark to form the sharing image, and output the sharing image. In this way, since the image processing apparatus outputs the watermarked image and the sharing image, the sharing image and the watermarked image may be present on a same display interface when displayed, and thus a better displaying effect can be achieved.

In another embodiment, when the sharer is allowed to share content, the image processing apparatus may obtain the sharing content transmitted by the image acquisition terminal, add the identity information of the sharer to the sharing content in the form of the watermark to form the sharing image, and output the sharing image to replace the watermarked image. In this way, since the image processing apparatus outputs the watermarked image previously and then outputs the sharing image, the watermarked image can be replaced by the sharing image when displayed, so that a displaying space of the sharing image can be increased. It is certain that, in this embodiment, before outputting the sharing image, either the watermarked image(s) with respect to the sharer and/or the ordinary participant or the image(s) with no watermark may be displayed; and when outputting the sharing image, the identity information of the sharer is displayed on the sharing image in the form of the watermark.

In the present embodiment, it should be understood that the information of the video conference may include conference time, conference place, conference security level, and the like. Taking the information of the video conference including the security level as an example, the image processing apparatus may set the conference security level in advance, and perform processing differently based on a determination on the conference security level. For a conference with a low conference security level, the image processing apparatus performs full-screen watermark processing on the image currently output from the conference venue of the person who performs surreptitious photographing, and watermark content includes key information such as the identity information of the person who performs surreptitious photographing, time information, conference venue information. For a conference with a high conference security level, the image processing apparatus outputs a black screen to the terminal at the conference venue of the person who performs surreptitious photographing, and a corresponding warning is prompted on the black screen. Meanwhile, in an embodiment, the image processing apparatus may broadcast the photographing behavior at this conference venue to other conference venues, so as to help participants at other conference venues to know this ongoing act at this conference venue which may leak conference information. Meanwhile, the image processing apparatus may capture a screen on the image from which an act of surreptitious photographing is detected to generate a record of surreptitious photographing, extracts the identity information of the person who performs surreptitious photographing, add content such as time, place, conference venue information, and the identity information of the person who performs surreptitious photographing to the record, and performs saving. Then, record information may be added to system log, and the record information includes information such as the identity information of the person who performs surreptitious photographing, time information, and conference venue information to assist in research on an information leaking source.

By utilizing the above technical solution adopted in the embodiments, the watermark about the identity information of the participant added to the image output by the video conference system in real time will help a participant to know the identity information of all participants, such as identity information of a person who is speaking in the conference at the moment, identity information of a sharer of currently displayed sharing data, and identity information of a participant who is performing surreptitious photographing on the conference content, thereby enhancing the usability and security of the video conference system.

The image processing method based on the video conference provided in the embodiments of the present disclosure will be further explained in specific application scenarios.

Figure 2:
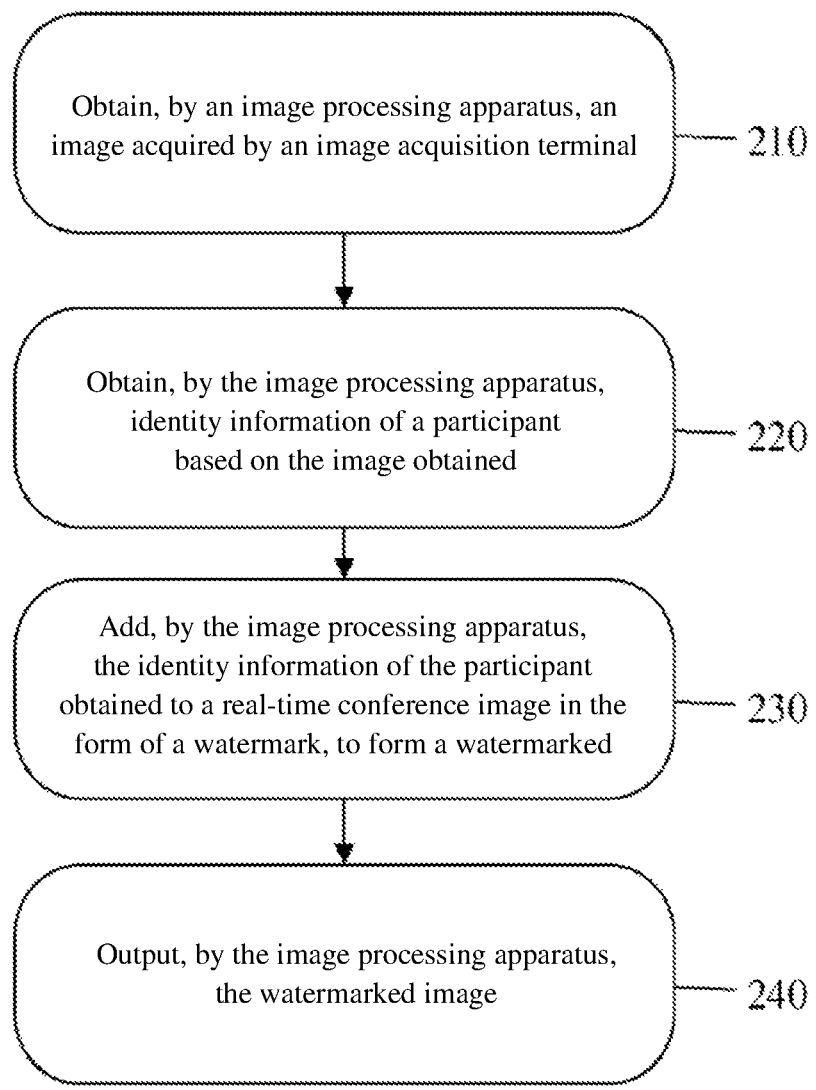
FIG. 2 is a flowchart of an image processing method based on a video conference provided according to an embodiment of the present disclosure.

FIG. 2 is a flowchart of an image processing method based on a video conference provided according to an embodiment of the present disclosure. Referring to FIG. 2, the image processing method based on the video conference provided in the present embodiment may include the following steps. At step 210, the image processing apparatus obtains an image acquired by an image acquisition device. At step 220, the image processing apparatus obtains identity information of a participant based on the image obtained. At step 230, the image processing apparatus adds the identity information of the participant obtained to a real-time conference image in the form of a watermark, to form a watermarked image. At step 240, the image processing apparatus outputs the watermarked image.

The image processing apparatus may add a corresponding watermark about the identity information to each frame of the real-time conference image of a conference venue participated by the participant, to form a watermarked image. The watermarked image is a real-time conference image output to the conference venue of the video conference, and the identity information of the participant is correspondingly displayed at a corresponding position thereof on each frame output. In the present embodiment, the participant may be a viewer of the video conference.

According to the image processing method provided in the present embodiment, by adding the watermark about the identity information of the participant to the image in the video conference, the participant can be helped to know the identity information of the participant present in the image, thereby enhancing the security and usability of the video conference system.

Figure 3:
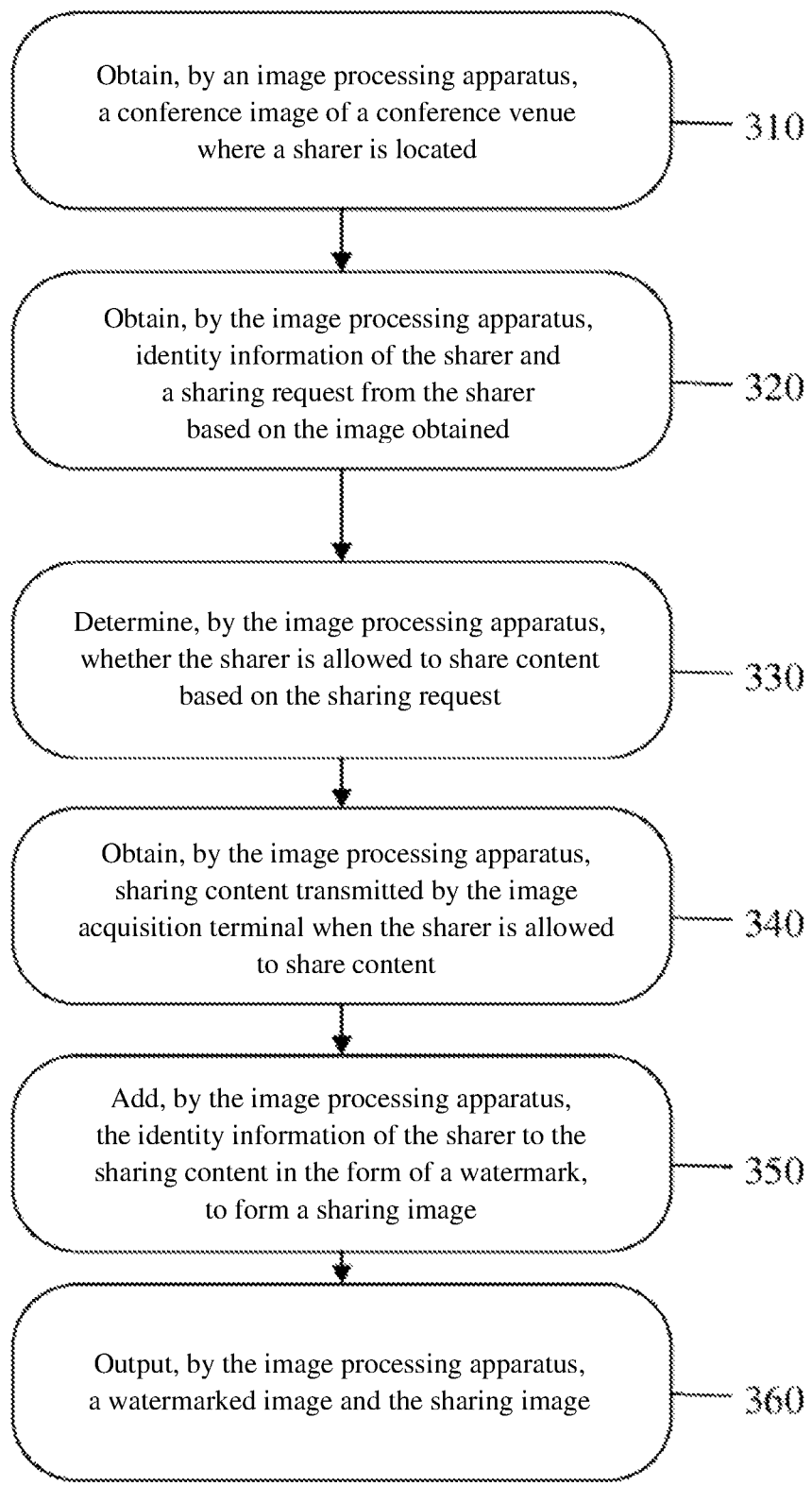
FIG. 3 is a flowchart of an image processing method based on a video conference provided according to an embodiment of the present disclosure.

FIG. 3 is a flowchart of an image processing method based on a video conference provided according to an embodiment of the present disclosure. Referring to FIG. 3, the image processing method provided in the present embodiment may include the following steps.

At step 310, the image processing apparatus obtains a conference image of a conference venue where a sharer is located.

The sharer is a person, among participants, who is to share sharing content in his/her own device, such as a mobile phone or a tablet computer, to other participants. The content to be shared may be data that is prepared in advance before the conference and is related to the subject of the conference, and may be an audio, a video, text, and the like.

At step 320, the image processing apparatus obtains identity information of the sharer and a sharing request from the sharer based on the image obtained.

The sharer makes a request to share content by way of gesture, voice, and the like. For example, the sharer indicates sharing intention by raising his/her hand, speaking aloud, or raising his/her hand and speaking aloud within a range of a group of panoramic cameras.

At step 330, the image processing apparatus determines whether the sharer is allowed to share content based on the sharing request.

The image processing apparatus executes functions of human face recognition and voice recognition to compare biometric information of the sharer in a real-time conference image uploaded by an image acquisition terminal with corresponding characteristic information in an identity information repository stored in the image processing apparatus, to determine legality of the identity information of the sharer. If the biometric information of the sharer matches the characteristic information in a real-time legal identity information repository, it is determined that the identity information of the sharer is legal; otherwise, if the identity information of the sharer does not have a match in the real-time legal identity information repository, it is determined that the identity information of the sharer is illegal.

After it is determined that the identity information of the sharer is legal, the image processing apparatus may, by combining action recognition and voice recognition, compare a corresponding action or voice in the above image of the sharer acquired with the preset action and voice of the sharing request image in the image processing apparatus, and if the corresponding action or voice in the above image of the sharer acquired matches the preset action and voice of the sharing request in the image processing apparatus, it is determined that the participant makes a valid sharing request; otherwise, if the corresponding action or voice in the above image of the sharer acquired does not match the preset action and voice of the sharing request in the image processing apparatus, it is determined that the participant does not make the valid sharing request.

After it is determined that the sharer makes the valid sharing request, the image processing apparatus may send a message that the sharer makes the sharing request to a sharing control terminal. After receiving the message that the sharer makes the sharing request, the sharing control terminal determines whether sharing is allowed.

The sharing control terminal may be a terminal in a conference venue where a host of the conference is located, and the host of the conference may be a general superintendent of the conference. The host of the conference may determine whether to allow sharing. For example, the host of the conference nods to indicate allowing, directly says "allow to share", or nods and directly says "allow to share".

The group of panoramic cameras acquires real-time conference images of the conference venue of the host of the conference, the sharing control terminal receives the real-time conference images of the conference venue of the host of the conference acquired by the group of panoramic cameras, and the sharing control terminal sends the real-time conference images to the image processing apparatus.

The image processing apparatus executes a function of human face recognition to perform matching on biometric information of the participant in the real-time conference images of the conference venue of the host of the conference uploaded by the sharing control terminal and characteristic information in the identity information repository stored in the image processing apparatus, to determine that the participant is the host of the conference.

When a sharing consent feedback from the sharing control terminal is received, it is determined that the sharer is allowed to share content; and when no sharing consent feedback from the sharing control terminal is received, it is determined that the sharer is disallowed to share content.

For example, after the image processing apparatus confirms identity of the host of the conference, the image processing apparatus determine, by combining the action recognition and the voice recognition, whether a voice and an action of the host of the conference acquired matches the preset sharing consent action and voice in the image processing apparatus. If the voice and the action of the host of the conference acquired matches the preset sharing consent action and voice in the image processing apparatus, it is determined that the host of the conference agrees the sharing request; and if the voice and the action of the host of the conference acquired does not match the preset sharing consent action and voice in the image processing apparatus, it is determined that the host of the conference does not agree the sharing request.

After the image processing apparatus confirms the identity of the host of the conference and the host of the conference agrees the sharing request, the image processing apparatus sends a message that the host of the conference allows the sharer to share content to the image acquisition terminal.

At step 340, when the sharer is allowed to share content, the image processing apparatus obtains sharing content transmitted by the image acquisition terminal.

A prompt pops up on an interface of the image acquisition terminal, and then the sharer shares the content through a sharing interface disposed in the image acquisition terminal.

The sharer may send sharing data, such as an audio, a video, and an image, to the image acquisition terminal by means of screen projection through the sharing interface, for example, a device such as his/her mobile phone or tablet computer, and the image acquisition terminal then transmits the data shared to the image processing apparatus.

The image acquisition terminal is a terminal at a conference venue where the sharer is located.

At step 350, the image processing apparatus adds the identity information of the sharer to the sharing content in the form of a watermark, to form a sharing image.

The image acquisition terminal uploads the sharing content acquired from the sharing interface to the image processing apparatus, and the image processing apparatus determines a type of the sharing content and performs processing. If the sharing content is the audio, the image processing apparatus adds subtitles corresponding to audio content in the image and adds a watermark about the identity information of the sharer at a corresponding position of the subtitles. If the sharing content is the video, the image processing apparatus dynamically adds the watermark about the identity information of the sharer at a proper position in the video.

At step 360, the image processing apparatus outputs a watermarked image and the sharing image.

In the present embodiment, it should be understood that the watermarked image and the sharing image output by the image processing apparatus may be present on a same display interface and may not overlap with each other. However, in another embodiment, the watermarked image may be output first, and when the sharing image is to be output, the watermarked image is replaced by the sharing image. In this way, only the sharing image is displayed, rather than the watermarked image.

In addition, in the present embodiment, the watermarked image and the sharing image have a watermark respectively, and specific nomenclature herein is only used for the purpose of distinguishing.

According to the image processing method provided in the present embodiment, by adding the watermark about the identity information of the sharer to the image in the video conference, the participant can be helped to know the identity information of the sharer present in the image, thereby enhancing the security and usability of the video conference system.

Figure 4:
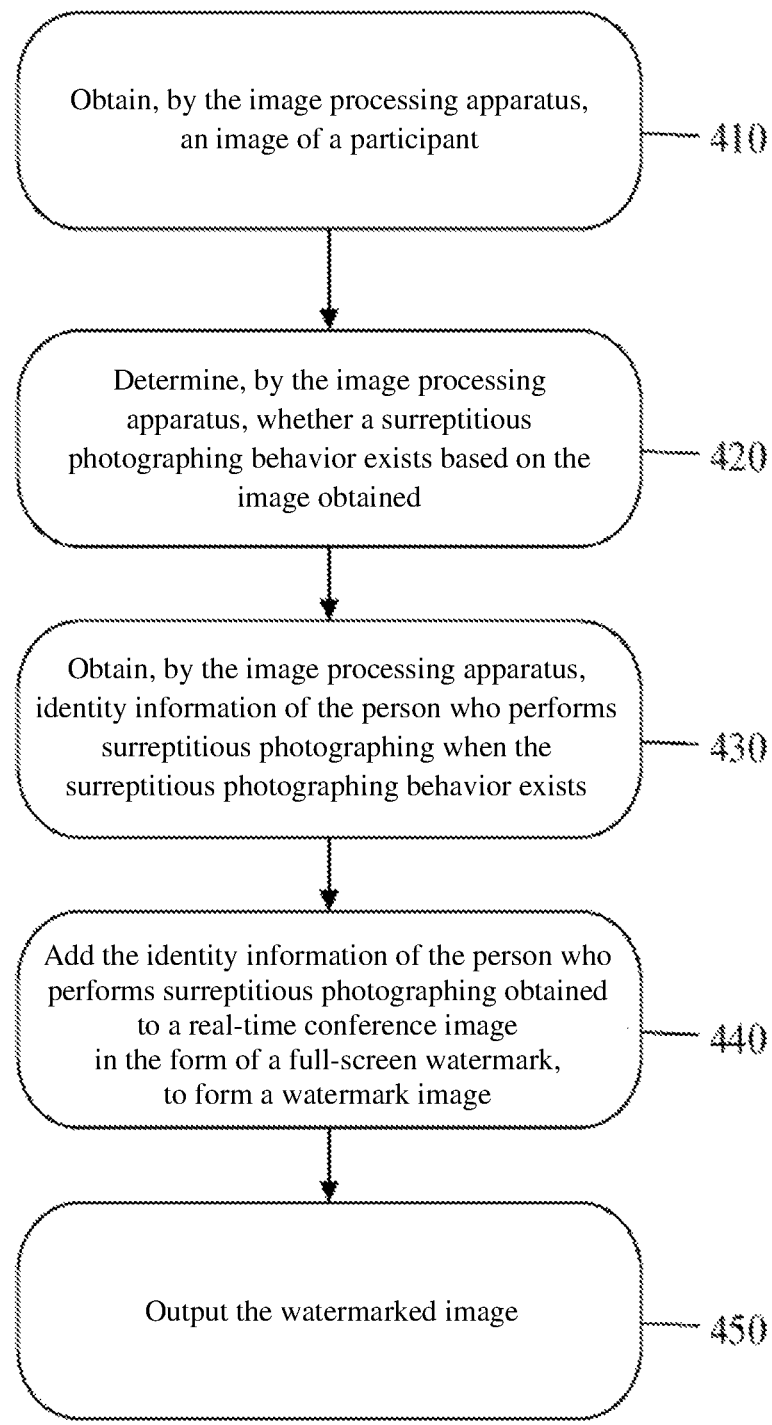
FIG. 4 is a flowchart of an image processing method based on a video conference provided according to an embodiment of the present disclosure.

FIG. 4 is a flowchart of an image processing method based on a video conference provided according to an embodiment of the present disclosure. Referring to FIG. 4, the image processing method provided in the present embodiment may include the following steps.

At step 410, the image processing apparatus obtains an image of a participant.

At step 420, the image processing apparatus determines whether a surreptitious photographing behavior exists based on the image obtained.

At step 420, the image processing apparatus may identify a suspected surreptitious photographing behavior. For example, if an action of the participant of a real-time conference is similar to a pre-stored suspected photographing action in the image processing apparatus, it is determined that the participant is suspected to perform photographing. The image processing apparatus gives an instruction to enable a camera at this conference venue to focus on the participant who is suspected to perform photographing, so as to obtain a clearer image.

Thereafter, the image processing apparatus may use a clearer focused image to perform a second determination by action recognition. If an action of the participant in the focused image matches the pre-stored photographing action in the image processing apparatus, it is determined that the participant has taken the surreptitious photographing behavior, otherwise it is determined that the participant has not taken the surreptitious photographing behavior.

At step 430, when the surreptitious photographing behavior exists, the image processing apparatus obtains identity information of the person who performs surreptitious photographing.

Meanwhile, after determining identity of the person who performs surreptitious photographing, the image processing apparatus may capture a screen on the image of the surreptitious photographing behavior to generate a recording image of surreptitious photographing, and may record information such as the identity information of the person who performs surreptitious photographing, the time of surreptitious photographing, and the place of surreptitious photographing in the log.

At step 440, the identity information of the person who performs surreptitious photographing obtained is added to a real-time conference image in the form of a full-screen watermark, to form a watermarked image.

In the present embodiment, before adding the watermark, information of the video conference may be obtained first; and when the information of the video conference meets a specified condition, the identity information obtained is added to the image in the form of the full-screen watermark.

It should be noted that the step 440 is merely exemplary. In the present embodiment, the information of the video conference may include conference time, conference place, conference security level, and the like. Taking the information of the video conference including the security level as an example, the conference security level may be set in advance, so as to perform processing differently based on a determination on the conference security level. For a conference with a low conference security level, the image processing apparatus performs full-screen watermark processing on the image currently output from the conference venue of the person who performs surreptitious photographing, and watermark content includes key information such as the identity information of the person who performs surreptitious photographing, time information, conference venue information. For a conference with a high conference security level, the image processing apparatus may, for example, outputs a black screen to the terminal at the conference venue of the person who performs surreptitious photographing, and a corresponding warning is prompted on the black screen.

In an embodiment, the image processing apparatus may broadcast the photographing behavior at this conference venue where surreptitious photographing is performed to other conference venues, so as to help participants at other conference venues to know an act which may leak conference information is ongoing at this conference venue.

At step 450, the watermarked image is output.

According to the image processing method provided in the present embodiment, by adding the watermark about the identity information of the person who performs surreptitious photographing to the image of the video conference, the participant can be helped to know the identity information of the person who performs surreptitious photographing present in the image, thereby enhancing the security and usability of the video conference system. Meanwhile, when the video conference is leaked, the person who caused such leaking can be locked conveniently and fast, so as to effectively prevent leaking of the video, thereby enhancing the security of the video conference system.

Figure 5:
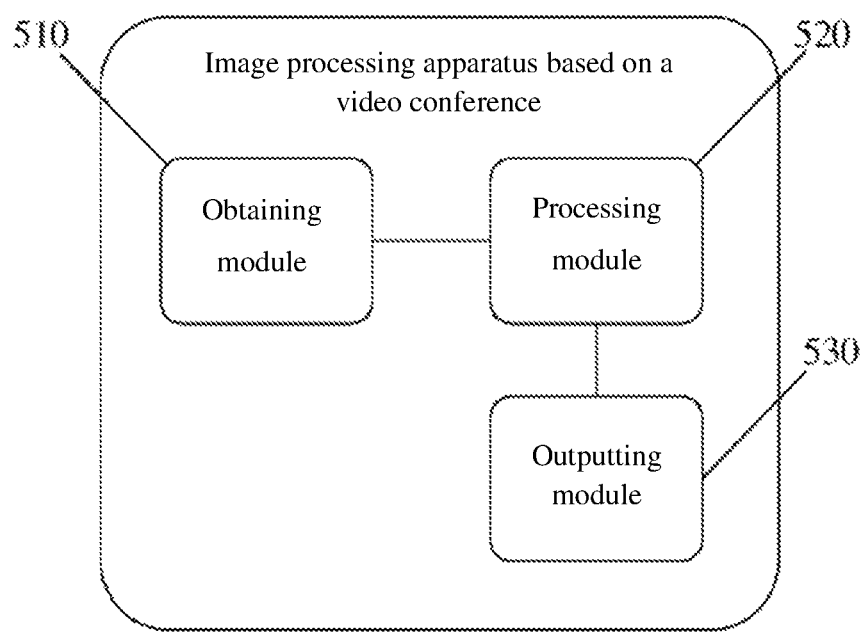
FIG. 5 is a block diagram of a structure of an image processing apparatus based on a video conference provided according to an embodiment of the present disclosure.

FIG. 5 is a block diagram of a structure of an image processing apparatus based on a video conference provided according to an embodiment of the present disclosure.

Referring to FIG. 5, the image processing apparatus based on the video conference provided according to the present embodiment may include: an obtaining module 510, which is configured to obtain an image transmitted by the image acquisition terminal and obtain identity information of a participant; a processing module 520, which is configured to add the identity information obtained by the obtaining module to the image in the form of a watermark, to form a watermarked image; and an outputting module 530, which is configured to output the watermarked image.

In an embodiment of the present disclosure, when obtaining the identity information of the participant, the obtaining module 510 is further configured to obtain biometric information of the participant from the image, to match the biometric information obtained with characteristic information in an identity information repository which includes characteristic information of the participant, identity information of the participant, and a correspondence relationship between the characteristic information and the identity information, and to use, if characteristic information matching the biometric information obtained exists in the identity information repository, identity information corresponding to the characteristic information matched as the identity information of the participant.

In an embodiment of the present disclosure, the processing module 520 is further configured to determine feature parameters for the image, the feature parameters including at least either of a person size of the participant and a position of the participant, and to determine an addition position of the watermark in the image based on the feature parameters, the addition position changes with variation in the feature parameters. Adding the identity information obtained to the image in the form of the watermark may include: adding the identity information obtained to the image in the form of the watermark at the addition position.

In an embodiment of the present disclosure, when the participant is a sharer, after the obtaining module obtains the image transmitted by the image acquisition terminal, the obtaining module 510 is further configured to obtain a sharing request from the sharer; the processing module 520 is further configured to determine whether to allow the sharer to share content based on the sharing request, and send a sharing consent message to the image acquisition terminal when the sharer is allowed to share content; the obtaining module 510 is further configured to receive sharing content transmitted by the image acquisition terminal; the processing module 520 is further configured to add identity information of the sharer to the sharing content in the form of the watermark, to form a sharing image; and the outputting module 530 is configured to output the sharing image. In this case, the sharing image and the watermarked image may be present on a same display interface when displayed.

In an embodiment of the present disclosure, during a process of determining whether to allow the sharer to share content based on the sharing request, the processing module is further configured to determine whether the sharer is an authorized participant based on the sharing request, to determine that the sharer is disallowed to share content when the sharer is an unauthorized participant, to send the sharing request to a sharing control terminal when the sharer is an authorized participant, to determine that the sharer is allowed to share content when a sharing consent feedback sent by the sharing control terminal is received, and to determine that the sharer is disallowed to share content when no sharing consent feedback sent by the sharing control terminal is received.

In an embodiment of the present disclosure, when the participant is a sharer, after obtaining the identity information of the participant, the obtaining module 510 is further configured to obtain sharing content transmitted by the image acquisition terminal when it is determined that the sharer is allowed to share content; the processing module 520 is further configured to add the identity information of the sharer to the sharing content in the form of the watermark, to form a sharing image; and the outputting module 530 is further configured to output the sharing image to replace the watermarked image.

In an embodiment of the present disclosure, when the participant is a person who performs surreptitious photographing, during a process of obtaining the identity information of the participant, the obtaining module 510 is further configured to determine whether a surreptitious photographing behavior exists based on the image obtained, and to obtain identity information of the person who performs surreptitious photographing when the surreptitious photographing behavior exists. During a process of adding the identity information obtained to the image in the form of the watermark, the processing module is further configured to obtain information of the video conference, and to add the identity information obtained to the image in the form of the watermark when the information of the video conference meets a specified condition.

In an embodiment of the present disclosure, during a process of determining whether the surreptitious photographing behavior exists, the obtaining module 510 is further configured to detect whether a suspected photographing behavior exists in the image obtained, to obtain a focused image with respect to the suspected photographing behavior acquired by the image acquisition terminal when the suspected photographing behavior exists in the image, and to determine whether a surreptitious photographing behavior exists based on the focused image.

By utilizing the above image processing apparatus in the present embodiment, the disclosed solution can be applied for a video conference, and by adding the watermark about the identity information of the participant in the image of the video conference, a viewer can be helped to know the identity information of the participant. For example, the participant may be helped to know identity information of a person who is speaking at the moment in the conference, identity information of a sharer of sharing data currently displayed, identity information of participant who is performing surreptitious photographing on content of the conference, so as to improve the security and usability of the video conference system.

In addition, the present disclosure further provides an image processing terminal. The image processing terminal may include a memory and a processor. The memory stores computer instructions thereon, and the computer instructions, when executed by the processor, implement any image processing method described herein.

In addition, the present disclosure further discloses a computer storage medium. The computer storage medium stores computer instructions thereon, and the computer instructions, when executed, implement any image processing method described herein.

Those skilled in the art should understand that an embodiment of the present disclosure may be provided as a method, a system, or a computer program product. Accordingly, the present disclosure may adopt an embodiment of hardware only, an embodiment of software only, or an embodiment of a combination of hardware and software. Moreover, the present disclosure may adopt a computer program product that can be implemented on one or more computer usable storage medium(s) (which includes/include, but is/are not limited to, a disk memory, a CD-ROM, an optical memory, and so on) which includes/include computer usable program codes therein.

The present disclosure is described by referring to a flowchart and/or a block diagram of a method, a device (system), and a computer program product according to embodiments of the present disclosure. It should be understood that each procedure and/or each block in the flowchart and/or the block diagram and a combination of a procedure and/or a block in the flowchart and/or the block diagram may be implemented by computer program instructions. These computer program instructions can be provided to the processor of a general-purpose computer, a special-purpose computer, an embedded processor, or other programmable data processing devices to generate a machine, so that the instructions executed by the processor of the computer or other programmable data processing devices generate means for implementing the functions specified in one or more processes in the flowcharts and/or one or more blocks in the block diagrams.

These computer program instructions may also be stored in a computer-readable memory that can direct the computer or other programmable data processing equipment to work in a specific manner, so that the instructions stored in the computer-readable memory produce an article of manufacture including an instruction device. The instruction device implements functions specified in one or more processes in the flowchart and/or one or more blocks in the block diagram.

These computer program instructions may also be loaded on the computer or other programmable data processing equipment, so that a series of operation steps are executed on the computer or other programmable equipment to produce computer-implemented processing. In this way, instructions executed on the computer or other programmable equipment provide steps for implementing functions specified in one or more processes in the flowchart and/or one or more blocks in the block diagram.

In a typical configuration, a computing device includes one or more processors (CPUs), an input/output interface, a network interface, and a memory.

The memory may include a volatile memory, a random access memory (RAM), and/or a non-volatile, such as a read-only memory (ROM) or a flash memory (flash RAM). The memory is an example of the computer readable mediums.

Computer-readable medium may include permanent and non-permanent, removable and non-removable mediums, and information storage may be realized by any method or technology. Information may be computer-readable instructions, data structures, program modules, or other data. Examples of computer storage mediums include, but are not limited to, a phase change memory (PRAM), a static random access memory (SRAM), a dynamic random access memory (DRAM), and other types of random access memory (RAM), read-only memory (ROM), electrically erasable programmable read-only memory (EEPROM), flash memory or other memory technologies, a compact disc read-only memory (CD-ROM), a digital versatile disc (DVD) or other optical storage, a magnetic cassette, a magnetic tape, a magnetic disk storage or other magnetic storage devices or any other non-transmission mediums, and the computer storage mediums may be configured to store information that can be accessed by the computing device. According to the definition herein, the computer-readable mediums do not include transitory media, such as modulated data signals and carrier waves.

The terms "include", "including", or any other variation thereof, are intended to cover a non-exclusive inclusion, such that a process, a method, an article, or an apparatus that includes a series of elements not only includes those elements but also may include other elements not expressly listed or inherent to such process, method, article, or apparatus. An element preceded by "includes a . . . " does not, without more constraints, preclude the existence of additional identical elements in the process, method, article, or apparatus that includes the element.

It should be understood by a person skilled in the art that a disclosed embodiment may be provided as a method, a system, or a computer program product. Accordingly, the present disclosure may adopt an embodiment of hardware only, an embodiment of software only, or an embodiment of a combination of hardware and software. Moreover, the present disclosure may adopt a computer program product that can be implemented on one or more computer usable storage medium(s) (which includes/include, but is/are not limited to, a disk memory, a CD-ROM, an optical memory, and so on) which includes/include computer usable program codes therein.

The above description only involves embodiments of the present disclosure, but is not intended to limit the invention. For a person skilled in the art, many modifications and variations are possible within the scope of the disclosure. Any modifications, equivalent replacements, and improvements made within the spirit and principle of the present disclosure shall fall within the scope of the appended claims.

What is claimed is:

1. An image processing method based on a video conference, comprising:
   obtaining an image transmitted by an image acquisition terminal;
   obtaining identity information of a participant;
   adding the identity information obtained to the image in the form of a watermark, to form a watermarked image; and
   output the watermarked image;
   wherein when the participant is a person who performs surreptitious photographing, obtaining the identity information of the participant comprises:
      determining whether a surreptitious photographing behavior exists based on the image obtained, and
      wherein determining whether the surreptitious photographing behavior exists based on the image obtained comprises:
         detecting whether a suspected photographing behavior exists in the image obtained;
         obtaining a focused image with respect to the suspected photographing behavior acquired by the image acquisition terminal when the suspected photographing behavior exists in the image obtained; and
         determining whether a surreptitious photographing behavior exists based on the focused image.

2. The image processing method according to claim 1, wherein obtaining the identity information of the participant comprises:
   obtaining biometric information of the participant in the image;
   performing matching on the biometric information obtained and characteristic information in an identity information repository which comprises characteristic information of the participant, identity information of the participant, and a correspondence relationship between the characteristic information and the identity information; and using, if the identity information repository contains characteristic information that matches the biometric information obtained, identity information corresponding to the characteristic information matched as the identity information of the participant.

3. The image processing method according to claim 1, wherein after the image acquisition terminal outputs the image, the method further comprises:

determining feature parameters for the image, the feature parameters comprising at least either of a person size of the participant and a position of the participant; and determining an addition position of the watermark in the image based on the feature parameters, wherein the addition position changes with variation in the feature parameters; and adding the identity information obtained to the image in the form of the watermark comprises: adding the identity information obtained to the image in the form of the watermark at the addition position.

4. The image processing method according to claim 1, wherein when the participant is a sharer, after obtaining the image transmitted by the image acquisition terminal, the method further comprises:

obtaining a sharing request from the sharer;

determining whether to allow the sharer to share content based on the sharing request, sending a sharing consent message to the image acquisition terminal when the sharer is allowed to share content;

receiving sharing content transmitted by the image acquisition terminal;

adding identity information of the sharer to the sharing content in the form of the watermark, to form a sharing image; and outputting the sharing image, wherein the sharing image and the watermarked image are present on a same display interface when displayed.

5. The image processing method according to claim 4, wherein determining whether to allow the sharer to share content based on the sharing request comprises:

determining whether the sharer is an authorized participant;

determining that the sharer is disallowed to share content when the sharer is an unauthorized participant;

sending the sharing request to a sharing control terminal when the sharer is an authorized participant;

allowing the sharer to share content when a sharing consent feedback sent by the sharing control terminal is received; and disallowing the sharer to share content when no sharing consent feedback sent by the sharing control terminal is received.

6. The image processing method according to claim 1, wherein when the participant is a sharer, after obtaining the identity information of the participant, the method further comprises:

obtaining sharing content transmitted by the image acquisition terminal when the sharer is allowed to share content;

adding identity information of the sharer to the sharing content in the form of the watermark, to form a sharing image; and outputting the sharing image to replace the watermarked image.

7. The image processing method according to claim 1, wherein after determining whether a surreptitious photographing behavior exists based on the image obtained, the method further comprises:

obtaining identity information of the person who performs surreptitious photographing when the surreptitious photographing behavior exists; and adding the identity information obtained to the image in the form of the watermark comprises:

obtaining information of the video conference, and adding the identity information obtained to the image in the form of the watermark when the information of the video conference meets a specified condition.

8. An image processing apparatus based on a video conference, comprising:

a processor; and a memory coupled to the processor and storing instructions that, when executed by the processor, cause the image processing apparatus to execute:

an obtaining module configured to obtain an image transmitted by an image acquisition terminal and obtain identity information of a participant;

a processing module configured to add the identity information obtained by the obtaining module to the image in the form of a watermark, to form a watermarked image; and an outputting module configured to output the watermarked image;

wherein when the participant is a person who performs surreptitious photographing, and during a process of obtaining the identity information of the participant, the obtaining module is further configured to:

determine whether a surreptitious photographing behavior exists based on the image obtained, and wherein during a process of determining whether the surreptitious photographing behavior exists based on the image obtained, the obtaining module is configured to:

detect whether a suspected photographing behavior exists in the image obtained;

obtain a focused image with respect to the suspected photographing behavior acquired by the image acquisition terminal when the suspected photographing behavior exists in the image obtained; and determine whether a surreptitious photographing behavior exists based on the focused image.

9. The image processing apparatus according to claim 8, when obtaining the identity information of the participant, the obtaining module is configured to:

obtain biometric information of the participant in the image;

perform matching on the biometric information obtained and characteristic information in an identity information repository which comprises characteristic information of the participant, identity information of the participant, and a correspondence relationship between the characteristic information and the identity information; and use, if the identity information repository contains characteristic information that matches the biometric information obtained, identity information corresponding to the characteristic information matched as the identity information of the participant.

10. The image processing apparatus according to claim 8, wherein the processing module is further configured to:

determine feature parameters for the image, the feature parameters comprising at least either of a person size of the participant and a position of the participant; and determine an addition position of the watermark in the image based on the feature parameters, wherein the addition position changes with variation in the feature parameters; and adding the identity information obtained to the image in the form of the watermark comprises: adding the identity information obtained to the image in the form of the watermark at the addition position.

11. The image processing apparatus according to claim 8, when the participant is a sharer, after the obtaining module obtains the image transmitted by the image acquisition terminal, the obtaining module is further configured to obtain a sharing request from the sharer;

the processing module is further configured to determine whether to allow the sharer to share content based on the sharing request, and send a sharing consent message to the image acquisition terminal when the sharer is allowed to share content;

the obtaining module is further configured to receive sharing content transmitted by the image acquisition terminal;

the processing module is further configured to add the identity information of the sharer to the sharing content in the form of the watermark, to form a sharing image; and the outputting module is further configured to output the sharing image, wherein the sharing image and the watermarked image are present on a same display interface when displayed.

12. The image processing apparatus according to claim 11, wherein during a process of determining whether to allow the sharer to share content based on the sharing request, the processing module is configured to:

determine whether the sharer is an authorized participant;

determine that the sharer is disallowed to share content when the sharer is an unauthorized participant;

send the sharing request to a sharing control terminal when the sharer is an authorized participant;

determine that the sharer is allowed to share content when a sharing consent feedback sent by the sharing control terminal is received; and determine that the sharer is disallowed to share content when no sharing consent feedback sent by the sharing control terminal is received.

13. The image processing apparatus according to claim 8, wherein when the participant is a sharer, after obtaining the identity information of the participant, the obtaining module is further configured to obtain sharing content transmitted by the image acquisition terminal when the sharer is allowed to share content;

the processing module is further configured to add the identity information of the sharer to the sharing content in the form of the watermark, to form a sharing image; and the outputting module is further configured to output the sharing image to replace the watermarked image.

14. The image processing apparatus according to claim 8, the obtaining module is further configured to:

obtain identity information of the person who performs surreptitious photographing when the surreptitious photographing behavior exists; and during a process of adding the identity information obtained to the image in the form of the watermark, the processing module is configured to:

obtain information of the video conference, and add the identity information obtained to the image in the form of the watermark when the information of the video conference meets a specified condition.

\* \* \* \* \*